United States Patent [19]

McCaskill

[11] 4,185,856
[45] Jan. 29, 1980

[54] PIPE JOINT WITH REMOTELY OPERABLE LATCH

[75] Inventor: John W. McCaskill, Houston, Tex.

[73] Assignee: McEvoy Oilfield Equipment Company, Houston, Tex.

[21] Appl. No.: 927,369

[22] Filed: Jul. 24, 1978

Related U.S. Application Data

[63] Continuation of Ser. No. 701,080, Jun. 30, 1976, abandoned, which is a continuation of Ser. No. 544,656, Jan. 27, 1975, abandoned, which is a continuation of Ser. No. 350,982, Apr. 13, 1973, abandoned.

[51] Int. Cl.² .......................................... F16L 55/00
[52] U.S. Cl. .................................. 285/18; 285/85; 285/317; 285/330; 285/347; 285/351; 285/376; 285/391; 285/DIG. 14; 285/DIG. 21; 285/DIG. 23; 166/340; 166/367; 403/322; 403/349
[58] Field of Search ............. 285/18, 26, 29, 84, 285/85, 91, 92, 317, 330, 347, 351, 376, 391, 401, 402, DIG. 14, DIG. 21, DIG. 23; 166/0.5, 3400.6, 367; 403/322, 349

[56] References Cited

U.S. PATENT DOCUMENTS

| | | |
|---|---|---|
| 1,469,009 | 9/1923 | Overstreet .................. 285/391 X |
| 2,244,124 | 6/1941 | Shemeley .................... 285/84 X |
| 2,962,096 | 11/1960 | Knox ......................... 285/18 X |
| 3,032,125 | 5/1962 | Hiser et al. ............. 285/DIG. 21 |
| 3,071,188 | 1/1963 | Raulins ....................... 285/18 X |
| 3,163,224 | 12/1964 | Haeber et al. .................. 166/345 |
| 3,325,190 | 6/1967 | Eckert et al. ..................... 285/18 |
| 3,492,027 | 1/1970 | Herring .......................... 285/18 |
| 3,575,446 | 4/1971 | Brantley ......................... 285/85 |
| 3,700,267 | 10/1972 | Piegza ........................ 285/84 X |
| 3,800,869 | 4/1974 | Herd et al. ..................... 166/0.5 |
| 3,895,829 | 7/1975 | Manson, Jr. . |

FOREIGN PATENT DOCUMENTS

| | | |
|---|---|---|
| 1459935 | 10/1966 | France . |
| 393699 | 6/1933 | United Kingdom . |
| 409171 | 4/1934 | United Kingdom . |
| 945201 | 12/1963 | United Kingdom . |
| 992620 | 5/1965 | United Kingdom . |
| 1085054 | 9/1967 | United Kingdom . |

OTHER PUBLICATIONS

"A New Method for Fast and Economical Connection of Large Diameter Pipe", by Andre Drouin to the Society of Petroleum Engineers of AIME, in 1974.

*Primary Examiner*—C. J. Husar
*Assistant Examiner*—Moshe I. Cohen
*Attorney, Agent, or Firm*—Ned L. Conley; David M. Ostfeld; David Alan Rose

[57] ABSTRACT

First and second pipes supported substantially vertically in a subsea location with a breech block connector connecting the pipes together, the said breech block connector comprising male and female elements, one of which has longitudinally extending circumferentially spaced lugs thereon and the other of which has at least one longitudinally extending stop positioned to engage one of the lugs to limit relative rotation of the members when making up the connection, a longitudinally movable latch member on the other breech block element resiliently biased in a position to engage one of said lugs on the side opposite the stop to prevent relative rotation of the breech block elements in a direction to disconnect them, and a hydraulic cylinder having a piston and piston rod therein connected to the latch member, with biasing means applied to the piston to bias the latch into engagement with the lug and means for applying hydraulic fluid under pressure to both ends of said hydraulic cylinder.

11 Claims, 5 Drawing Figures

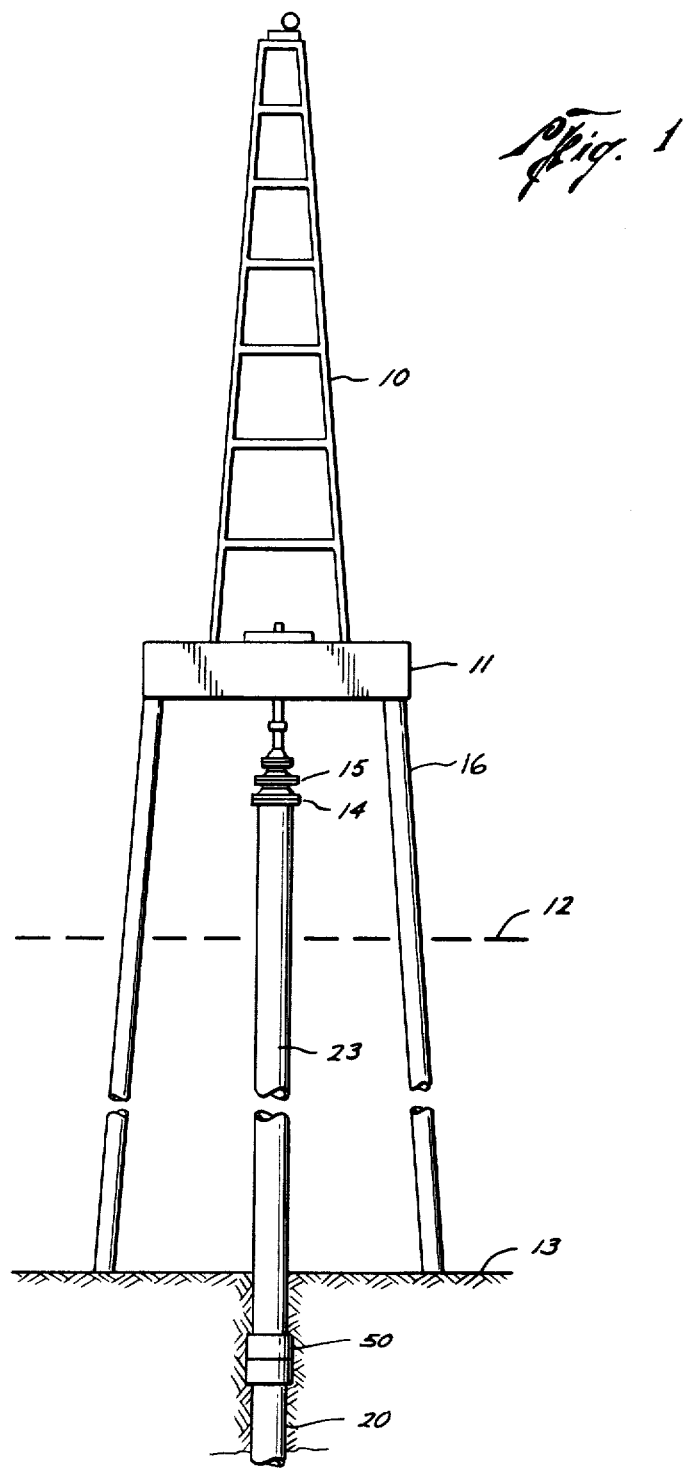

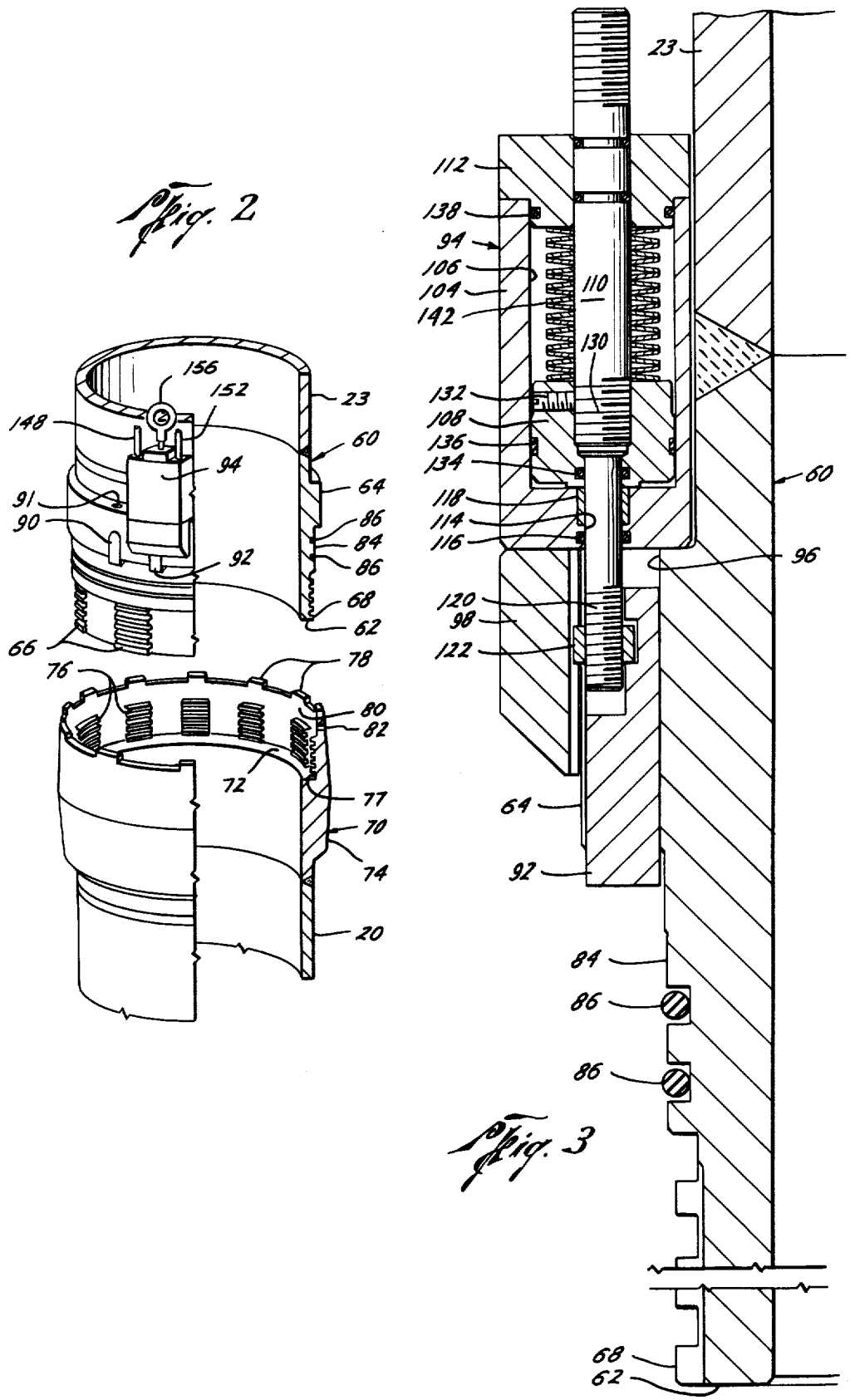

PIPE JOINT WITH REMOTELY OPERABLE LATCH

This is a continuation of application Ser. No. 701,080, filed June 30, 1976 now abandoned, which is a continuation of abandoned application Ser. No. 544,656, filed Jan. 27, 1975, which in turn was a continuation of abandoned application Ser. No. 350,982, filed Apr. 13, 1973.

BACKGROUND OF THE INVENTION

1. Field of the Invention

This invention relates to apparatus for connecting and disconnecting joints of pipe, particularly pipe joints in a string of pipe in an offshore location.

2. Description of the Prior Art

In the drilling of offshore oil and gas wells it is necessary to sink large pipes into the subsea bottom, such pipes consisting of a number of joints of pipe connected together end to end. For example, such pipes may consist of a conductor casing which is drilled, driven or jetted into the sea floor a substantial distance, and which has connected to its upper end and extending upwardly to an above-water platform or floating vessel a conductor riser which constitues a large diameter pipe through which drilling operations are performed.

In addition, the support legs of offshore platforms from which drilling operations are performed often consist of pipe through which hollow steel pilings are driven or drilled into the sea bed.

Each of such pipes have been connected by various means in the past, including ordinary screw threads, welding, clamps, and a special type of breech block connection such as is shown, for example, in U.S. Patent Application Ser. No. 103,839, filed Jan. 4, 1971, now U.S. Pat. No. 3,800,869 which is assigned to the assignee of the present application.

In making up the aforesaid strings of pipe, a first joint of pipe is lowered from a platform or vessel and following joints of pipe are connected in sequence above it. As each connection is made, the string of pipe is lowered until it sinks down into the sea bottom and the drilling, driving or jetting operation is then performed to sink the string deeper into the sea bottom, with additional joints of pipe being added as necessary. Because of many advantages found therein, the breech block connector, as, for example, of the type described in the aforesaid patent application Serial No. 103,839 has been found to be particularly advantageous. Such connections are made up at the surface and the connection is secured by a latch to prevent any possibility of the connection being released at an underwater or underground location.

However, in some instances it is necessary to disconnect a joint in a string of such pipe. For example, in the case of the conductor casing for an oil well, the conductor riser may be disconnected after the well is completed, since it is not needed thereafter. In the past it has been necessary to stop all operations on the platform and send a diver down to release the latch so that the joint may be disconnected. This has been a very undersirable and expensive practice, because no operations can be performed while the diver is under water, and the operation may take several hours in many cases. Furthermore, where the water is extremely deep or cold, or there is a high current flowing, or the connection to be released is buried in the mud, it is difficult if not impossible for a diver to release it.

SUMMARY OF THE INVENTION

It is an object of this invention to provide a releasable joint including means for remotely operating such joint for disconnection without the use of a diver.

According to this invention axially aligned pipes are connected by a breech block connection which is provided with a movable latch having a position which prevents disconnection of the pipe, and means engageable with the movable latch and operable from a remote location to move the latch to a position which will not prevent disconnection of the pipes.

The apparatus of this invention is simple, economical and reliable. Accidental disengagement of the joint is positively prevented, and easy removal of upper portions of the pipe string is accomplished.

BRIEF DESCRIPTION OF THE DRAWINGS

FIG. 1 is a schematic representation of a drilling rig and a platform in use on an underwater well with which the present invention might be used;

FIG. 2 is an exploded isometric quarter section view of a pipe connection according to one embodiment of this invention;

FIG. 3 is an enlarged vertical sectional view of the embodiment of the invention shown in FIG. 2;

DESCRIPTION OF THE PREFERRED EMBODIMENTS

Figure 4:
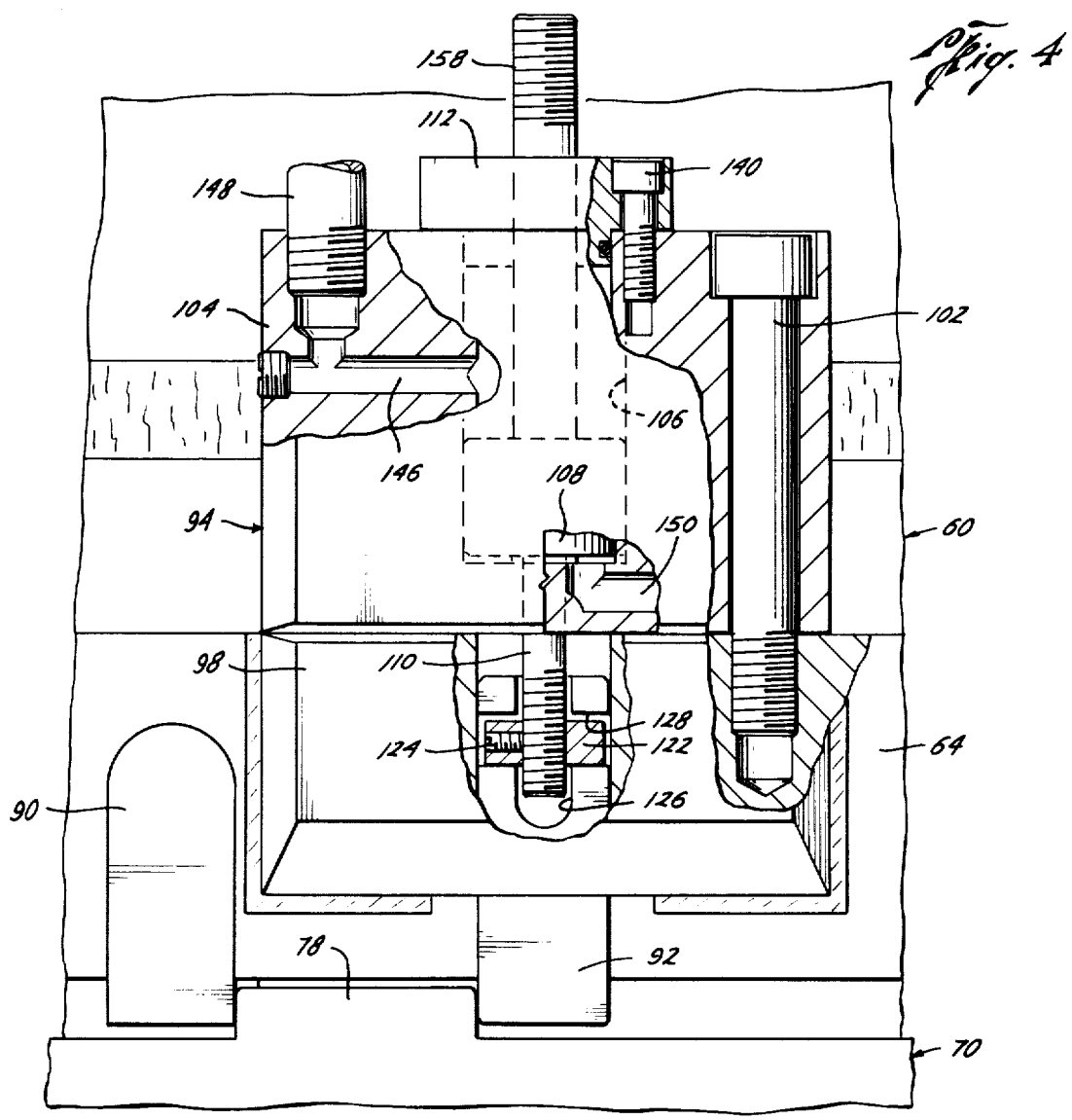
FIG. 4 is a fragmentary elevational view of the embodiment of the invention shown in FIG. 2, with parts broken away for clarity.
Figure 5:
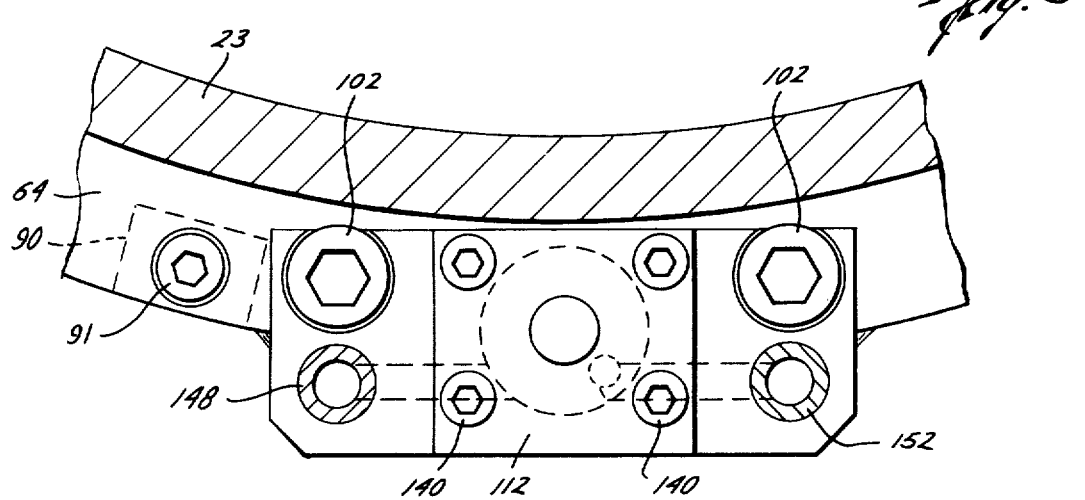
FIG. 5 is a fragmentary horizontal sectional view of the embodiment of the invention shown in FIG. 2.

FIG. 1 of the drawings schematically represents a drilling rig 10 mounted on a drilling platform 11 above a body of water 12. A conductor casing 20 penetrates the subsurface 13 of the water body and is connected below the mud line to a conductor riser 23 by a joint 50. The conductor riser 23 extends upwardly through the water to the platform 11 where it is surmounted by a landing base 14 and drilling control equipment 15. The drilling platform is supported on legs 16 which may include inner pilings as hereinbefore described.

The joint 50 is more fully illustrated in an exploded view in FIG. 2. As there seen, it comprises a male member 60 welded to the conductor riser 23 and a female member 70 welded to the conductor casing 20. The type joint shown is an internal flush joint, i.e. where the bores of the male and female joint members are the same as the inside diameter of the pipes, and the end 62 of the male member abuts a shoulder 72 in the female member, so that a smooth uninterrupted inside surface is provided. However, it will be appreciated that the apparatus of this invention is equally applicable to an external flush design.

The female joint member 70 comprises an enlarged diameter portion 74 which is counter bored to form the shoulder 72 and which has formed therein a plurality of circumferentially spaced apart groups 76 of axially spaced-apart no-lead threads. By "no-lead" is meant that the threads have zero pitch. Preferably the threads have a square profile. Any desirable number of such groups may be utilized, but for ease of make-up it has been found desirable to utilize groups of threads spaced 15 degrees to 60 degrees apart so that 6 to 24 groups of threads may be provided.

The upper end of the female member 70 is provided with a plurality of axially extending stop lugs 78, which preferably are spaced apart the same angle as the thread groups. Between the thread groups and the lugs there is provided a smooth unthreaded circumferentially extending sealing surface 80. A test port 82 passes through the wall of the female element into this smooth surface 80 and is adapted to be connected to a fluid pressure line.

The male member 60 is provided with a circumferentially extending enlarged flange 64 adjacent the point of connection with the conductor riser 23, and between the flange and the end 62 there is provided a plurality of circumferentially spaced apart groups 66 of axially spacedapart no-lead threads which are of such a size and spacing as to match with the groups of threads 76 in the female member. Preferably the bottom thread 68 on the male member is of enlarged thickness and the bottom thread 77 in the female member is spaced above the shoulder 72 a distance slightly greater than the thickness of thread 68. Thus when the male and female members are put together the thread groups 66 may be moved axially between the thread groups 76 of the female member until the bottom thread 68 engages the shoulder 72. Upon relative rotation of the male and female members, the thread groups 66 will move into engagement with the thread groups 76. Accidental engagement of only a portion of the threads of each thread group is precluded by the enlarged thickness thread 68.

Between the thread groups 66 and the flange 64 there is provided a smooth cylindrical surface 84 having a pair of spaced apart circumferentially extending O-ring seals 86 therein. The surface 84 and the seals 86 are dimensioned to fit within the cylindrical surface 80 of the female member, and in such a position that the test port 82 is in communication with the space between the O-ring seals. When the joint is assembled, fluid pressure can be applied here to check the seals 86 for leaks.

The flange 64 has provided thereon one or more fixed stop members 90 which extend downwardly from the lower edge of the flange a distance slightly less than the height of the stop lugs 78 on the female member. Each stop 90 may be secured in place by a cap screw 91. Each stop 90 is positioned circumferentially so that it will not be directly opposite a stop lug 78 when the thread groups 66 are positioned to move axially between the thread groups 76, and so that they will allow such axial movement as is necessary for the end 62 of the male member to engage the shoulder 72 in the female member, and will allow relative rotation between the male and female members sufficient for the thread groups to become substantially fully engaged. At this point the stop member should be up against a stop lug 78 to prevent further relative rotation of the male and female joint members in that direction.

The male member is also provided with one or more movable latches 92 which are positioned to engage the opposite side of a stop lug when the joint is fully made up, so that when the movable latch 92 is in such position it prevents relative rotation of the male and female members in a direction so as to disconnect the joint.

In the embodiment of the invention shown herein a latch actuating device 94 is attached to the male member 60 of the joint to provide means for engaging and disengaging the movable latch 92.

As seen in FIG. 3 the latch 92 slides longitudinally of the male joint member 60 in a groove 96 formed in the flange 64. The groove 96 is covered by a block 98 which is attached to the flange 64 as by welding. The block 98 has attached thereto as by the cap screws 102 a housing 104 for the operating unit 94. The housing 104 is bored to form a cylinder 106 therein extending longitudinally of the male joint member 60 and in alignment with the latch 92. A piston 108 is carried within the cylinder 106 and is mounted upon a piston rod 110. The piston 108 is affixed to the piston rod 110 as by means of threads 130 and a setscrew 132. The piston is provided with a suitable internal seal member 134 and external piston rings 136. The piston rod extends out both ends of the cylinder, the upper end extending through a cylinder head 112 which closes that end of the cylinder. A suitable seal member 138 is provided to seal between the cylinder head 112 and the housing 104. The cylinder head is retained in position as by means of cap screws 140, the lower end extending through a bore 114 which is provided with a suitable O-ring seal 116 and a bushing 118. This end of the rod is threaded at 120 to receive a nut 122 which is fastened to the rod by means of a setscrew 124. The rod 110 passes through a longitudinally extending slot 126 formed in the top of the latch member 92 and the nut 122 is received within a cross slot 128 in the top of the latch member.

The piston is resiliently biased in the position shown in FIG. 3 as by means of plurality of Bellvilie type springs 142 or other suitable resilient means. Fluid is provided to the spring side of the piston through a passage 146 which is connected to a fluid conduit 148. Fluid is provided to the other end of the cylinder through a passage 150 which is connected to a fluid conduit 152. Conduits 148 and 152 extend upwardly to the work platform and are connected to a suitable supply of high pressure hydraulic fluid, as is well known in the art.

In a typical application of the apparatus of this invention the spring 142 may be preloaded to several hundred pounds force, i.e. up to 400 pounds or more. Sufficient fluid pressure is made available to overcome the spring preload as well as any frictional load and other loads which may be present due to interference from mud or the like.

In a typical installation wherein a piston operating area of approximately two square inches is provided, a fluid pressure of 1,000 to 2,000 psi may be used.

As a safety measure, an eye nut 156 (see FIG. 2) may be affixed to the threaded end 158 of the shaft 110. Thus in the event of failure of the remotely operable equipment a line may be connected to the eye nut and the latch may be retracted by operation from the surface.

As previously noted, the joint of this invention is normally made up at the surface so that the operator may determine by observation that the joint is properly made up. Thus fluid pressure may be applied through the passage 150 to retract the piston, and thereby the latch 92, and the male and female members of the joint may be moved axially together until the end 62 abuts the shoulder 72, whereupon the members are relatively rotated until the stop 90 engages a lug 78. The fluid pressure may then be released so that the latch 92 moves down behind the stop lug to prevent any accidental disengagement.

Alternatively, the movable latch and the stop lug may be so positioned and dimensioned that it is not necessary to apply fluid pressure to retract the latch when the male and female members are engaged. Thus if so positioned that the movable latch is in alignment with a stop lug 78 when the thread groups 66 are in alignment with the spaces between the thread groups 76, the weight of the male element will force the movable latch upwardly against the force of the springs 142. Then upon relative rotation of the male and female elements the movable latch will spring out into latching position as soon as it passes the end of the lug.

This latter alternative would be particularly helpful in the case of making up such a connection at a remote location where the operator cannot observe the proper make-up of the connection.

Hydraulic pressure may be applied through the passageway 146 above the piston to reinforce the springs 142 as a safety measure to insure that the latch 92 is held in engagement.

Certain preferred embodiments of the invention have been shown and described herein. However, the invention is not limited to such specific embodiments, since many variations thereof will be apparent to those skilled in the art upon a consideration of this disclosure. Accordingly, the invention is to be considered to be limited only as defined by the accompanying claims.

I claim:

1. A structure comprising:
    a string of pipe adapted for coaxial connection supported substantially vertically in the ground;
    rotatably engaging connection means, composed of a first and second part, for each said pipe of said string mounted on adjoining ends of said pipes for disengageably serially connecting adjoining ends of said pipes, said second part including a substantially annular shaped flange, said annular shaped flange being coaxial with said pipe and extending substantially uniformly radially outward of said pipe, said annular shaped flange having an aperture therein;
    engagement members affixed to the first part of said connection means;
    a stop member mounted on said second part of said connection means engageable with one of said engagement members, upon connection of said adjoining ends of said pipes;
    a latch member housed within said aperture and mechanically engageable and disengageable with said engagement members, said latch member being substantially completely housed within said aperture in the disengaged position;
    one of said rotatably engaging connection means being a remote release rotatably engaging connection means for disengageably, remotely, serially connecting adjoining ends of two of said pipes;
    remote release means disposed on said remote release rotatably engaging connection means and connected to said latch member of said remote release rotatably engaging connection means for disengaging said latch member of said remote release rotatably engaging connection means from one of said engagement members of said remote release rotatably engaging connection means, the connection between said remote release means and said latch member of said remote release rotatably engaging connection means permitting horizontal and vertical movement of said latch member with respect to said remote release means while said latch member is engaged with said one of said engagement members to prevent transverse loads on said latch member caused by movement of said latch member.

2. The structure of claim 1 wherein said first part includes a first tubular conduit and said second part includes a second tubular conduit having said annular shaped flange and said aperture, said annular shaped flange forming part of the outer wall of said second tubular conduit.

3. The structure of claim 2 wherein said rotatably engaging connection means is a breech block connection.

4. The structure of claim 2 wherein said first tubular conduit has a tubular flange, said tubular flange forming part of the inner and outer walls of said first tubular conduit, said annular shaped flange forming part of the inner wall of said second tubular conduit, said annular shaped flange and said tubular flange having facing shoulders with an axial clearance therebetween, and wherein upon the engagement of said latch member with one of said engagement members, said latch member and said facing shoulder of said tubular flange of said first tubular conduit have an axial clearance therebetween and wherein said one of said engagement members and said facing shoulder of said annular shaped flange of said second tubular conduit have an axial clearance therebetween.

5. A remote latch for latching first and second tubular members of two pipes together wherein such tubular members include inner side juxtaposing portions forming one part of the walls of the tubular members and having a first set of facing arcuate shoulders and outer side juxtaposing portions forming the other part of the walls of the tubular members and having a second set of facing arcuate shoulders, the first tubular member outer side portion being formed by a substantially annular shaped flange with a substantially radially uniform outer surface, said annular shaped flange being coaxial with said first tubular member and having a slot therein, comprising:
    a movable latch member positioned within such slot with the outer periphery of such annular shaped flange adjacent said latch member being at a greater distance from the longitudinal axis of such first tubular member than the distance of the outer periphery of said latch member from such longitudinal axis, said movable latch member having an aperture therein;
    engagement means on such second tubular member outer side portion for engagement with the flank of said movable latch member for preventing relative rotation of such tubular members in one direction;
    stop means located on such outer side portions of said first and second tubular members for preventing relative rotation in the other direction; and
    remote actuator means located on such first tubular member engageable with said movable latch member and operable from a remote location for actuating said movable latch member, said remote actuator means including a rod, one end of said rod being disposed in said aperture of said movable latch member, said one end of said rod including connecting means mounted thereon and disposed in said aperture for connecting said rod to said movable latch member and for allowing limited horizontal and vertical travel of said movable latch member relative to said rod, the connection between said movable latch member and said rod permitting the transfer of longitudinal loads between said movable latch member and said rod and avoiding the transfer of transverse loads from said movable latch member to said rod during such limited travel of said movable latch member.

6. A remote latch for latching first and second tubular members of two pipes together wherein such tubular members include inner side juxtaposing portions forming a part of the inner walls of the tubular members and having a first set of facing arcuate shoulders and outer side juxtaposing portions forming a part of the outer walls of the tubular members and having a second set of facing arcuate shoulders, the first tubular member outer side portion being formed by a flange having a slot therein, comprising:

a movable latch member positioned within such slot with the outer periphery of such flange adjacent said latch member being at a greater distance from the longitudinal axis of such first tubular member than the distance of the outer periphery of said latch member from such longitudinal axis;

engagement means on such second tubular member outer side portion for engagement with the flank of said movable latch member for preventing relative rotation of such tubular members in one direction;

remote actuator means located on such first tubular member engageable with said movable latch member and operable from a remote location for actuating said movable latch member; and wherein said remote actuator means includes a rod connection including:

a rod;

slot means on said movable latch member for permitting slack between said movable latch member and said remote actuator means to prevent transverse loads on said movable latch member and said rod caused by movement of said movable latch member; and connection means mounted on said rod for connecting said rod to said movable latch member to transfer longitudinal loads between said movable latch member and said rod, said connection means being engagingly connected to said slot means.

7. A remote latch for latching first and second tubular members of two pipes together wherein such first tubular member includes at least one stop lug thereon and such second tubular member includes at least one engagement lug thereon, comprising:

a latch member disposed on such first tubular member, said latch member having means for mechanical engagement with such engagement lug, and said latch member being movable from a first position not in engagement with such engagement lug to a second position in engagement with such engagement lug when such engagement lug engages such stop lug after such tubular members are rotatably connected;

remote means disposed on such first tubular member operable from a remote location to move said latch member between said first and second positions and including an attachment member for connecting said remote release means to said latch member;

said latch member having means for permitting horizontal and vertical movement of said latch member with respect to said attachment member while said latch member is engaged with such engagement lug.

8. A remote latch for latching first and second tubular members of two pipes together, such first and second members each having a center and an outer peripheral surface, such first tubular member including a flange having a slot therein and at least one stop lug thereon, such second tubular member including at least one engagement lug thereon, comprising:

a latch member including means for abutting against such engagement lug and having an outer peripheral surface disposed in such slot, said latch member being movable from a first position not abutting against such engagement lug to a second position abutting against such engagement lug when such engagement lug engages such stop lug after such tubular members are rotatably connected;

remote means disposed on such first tubular member and engageable with said latch member and operable from a remote location to move said latch member between said first and second positions;

said latch member being dimensioned and positioned so that the distance between said outer peripheral surface of said movable latch member and such center of such first tubular member is less than the largest distance between such outer peripheral surfaces of such first and second tubular members and such centers of such first and second tubular members, and said movable latch member is positioned above such second tubular member; and wherein said remote means includes a rod connection including:

a rod;

slot means on said latch member for permitting slack between said latch member and said remote means to prevent transverse loads on said latch member and said rod caused by movement of said latch member; and connection means mounted on said rod for connecting said rod to said latch member to transfer longitudinal loads between said latch member and said rod, said connection means being engagingly connected to said slot means.

9. The remote latch of claim 8 wherein said remote actuator means includes means resiliently biasing said movable latch member into position to prevent rotation of such tubular members;

a double acting fluid cylinder and fluid application means connected to said remote latch member for the application of fluid pressure in one end of said fluid cylinder to act against said resiliently biasing means to move said remote latch member to a position which will allow relative rotation of such tubular members, and the application of fluid pressure to the other end reinforces said resiliently biasing means and holds said remote latch member in position to prevent rotation of such tubular members; and said double acting fluid cylinder includes a member having a seal cap and fluid inlets to said fluid application means, said seal cap having means for disconnection from said double acting fluid cylinder without disconnection of said fluid inlets to said fluid application means.

10. A structure comprising: a string of pipe adapted for coaxial connection supported substantially vertically in the ground, rotatably engaging connection means composed of a first and second part for each said pipe of said string mounted on adjoining ends of said pipes for disengageably serially connecting adjoining ends of said pipes;

engagement members affixed to the first part of said connection means;

a stop member mounted on each of said second part of said connection means engageable with one of said engagement members, upon connection of said adjoining ends of said pipes;

a latch member mounted on each of said second part of said connection means, said latch member having means for mechanical engagement and disengagement with said engagement members; and remote release means disposed on only one of said connection means for operation from a remote location and including an attachment member for connecting said remote release means to said latch member of said one of said connection means, said latch member having means for permitting horizontal and vertical movement of said latch member with respect to said attachment member while said latch member is engaged with one of said engagement members.

11. A remote latch for latching first and second tubular members of two pipes together, wherein such tubular members include facing first and second shoulders, respectively, such first and second shoulders each having a center and an outer peripheral surface and being approximately coaxial, and such first shoulder having a slot therein, comprising:

a movable latch member having an outer peripheral surface disposed in such slot;

engagement means on such second shoulder for engagement with said movable latch member for latching such tubular members;

remote actuator means located on such first tubular member engageable with said movable latch member and operable from a remote location for actuating said movable latch member;

said latch member being dimensioned and positioned so that the distance between said outer peripheral surface of said movable latch member and such centers of such first and second shoulders is less than the distance between such outer peripheral surfaces of such first and second shoulders and such centers of such first and second shoulders, and wherein said movable latch member is located above such second shoulder; and wherein said remote actuator means includes a rod connection including:

a rod;

slot means on said movable latch member for permitting slack between said movable latch member and said remote actuator means to prevent transverse loads on said movable latch member and said rod caused by movement of said movable latch member; and connection means mounted on said rod for connecting said rod to said movable latch member to transfer longitudinal loads between said movable latch member and said rod, said connection means being engagingly connected to said slot means.

* * * * *